United States Patent [19]

Inoue

[11] Patent Number: 5,221,126
[45] Date of Patent: Jun. 22, 1993

[54] BRAKE CONTROL SYSTEM FOR AUTOMOTIVE VEHICLE

[75] Inventor: Naohiko Inoue, Yokohama, Japan

[73] Assignee: Nissan Motor Co., Ltd., Japan

[21] Appl. No.: 737,745

[22] Filed: Jul. 30, 1991

[30] Foreign Application Priority Data

Jul. 30, 1990 [JP] Japan .................................. 2-202010

[51] Int. Cl.⁵ .............................. B60T 8/32; B60T 8/48
[52] U.S. Cl. ...................................... 303/13; 60/547.1;
 60/566; 188/358; 303/14; 303/15; 303/100;
 303/113.2; 303/114.1; 303/116.1; 303/117.1;
 303/119.2
[58] Field of Search ................ 303/113 TR, 110, 13,
 303/14, 15, 16, 17, 100, 92, 93, 95, 113 R, 113
 TB, 113 AP, 114 R, 115 R, 115 EC, 115 PP,
 116 R, 116 SP, 116 WP, 119 R, 119 SV, 117,
 118; 188/358; 60/545, 547.1, 565, 566;
 251/129.01, 129.06, 129.13; 318/640, 632;
 364/426.02, 426.03, 426.01

[56] References Cited

U.S. PATENT DOCUMENTS

| | | | |
|---|---|---|---|
| 4,681,373 | 7/1987 | Nomura et al. | 303/133 TR X |
| 4,755,008 | 7/1988 | Imoto et al. | |
| 4,765,691 | 8/1988 | Inoue et al. | 303/113 TR X |
| 4,807,943 | 2/1989 | Ogino | 303/113 TR |
| 4,812,777 | 3/1989 | Shirai | 303/14 |
| 4,836,618 | 6/1989 | Wakata et al. | 303/93 X |
| 4,902,075 | 2/1990 | Uno et al. | 303/119 SV |
| 4,934,762 | 6/1990 | Sato | 303/117 |
| 4,950,028 | 8/1990 | Harrison | 303/113 TR |
| 5,011,238 | 4/1991 | Brown, Jr. | 303/113 TR |
| 5,013,094 | 5/1991 | Nishii et al. | 188/358 X |
| 5,026,126 | 6/1991 | Umasankar et al. | 303/115 EC |
| 5,042,886 | 8/1991 | Sato | 303/117 X |
| 5,083,075 | 1/1992 | Sato et al. | 303/95 X |

FOREIGN PATENT DOCUMENTS

| | | | |
|---|---|---|---|
| 62-149543 | 12/1985 | Japan . | |
| 0071749 | 4/1987 | Japan | 303/119 SV |
| 0173363 | 7/1987 | Japan | 303/117 |

OTHER PUBLICATIONS

SAE Technical Paper No. 84 0468, p. 3, FIG. 3.

*Primary Examiner*—Douglas C. Butler
*Attorney, Agent, or Firm*—Lowe, Price, LeBlanc & Becker

[57] ABSTRACT

A brake control system for an automotive vehicle has an improved hydraulic circuit network which is capable of performing pressure boosting operation for a pressure supplied from a master cylinder, as well as anti-skid brake control operation and traction control operation. The system includes a valve device for selectively establishing and blocking fluid communication between master cylinder and wheel cylinder. The valve device is generally responsive to the fluid pressure supplied from the master cylinder to enter into pressure boosting mode in response to increase in the fluid pressure from the master cylinder across a predetermined value. An electronically operable boost control device cooperates with the valve device for varying pressure boosting magnitude depending upon vehicle driving condition. An electronically operable traction control device is also provided and cooperates with the boost control device for generating a braking force to decelerate a vehicle wheel irrespectively of manual operation state of brake system when wheel spinning is detected or predicted. The system exhibits high safety level by an enhanced fail-safe function.

15 Claims, 2 Drawing Sheets

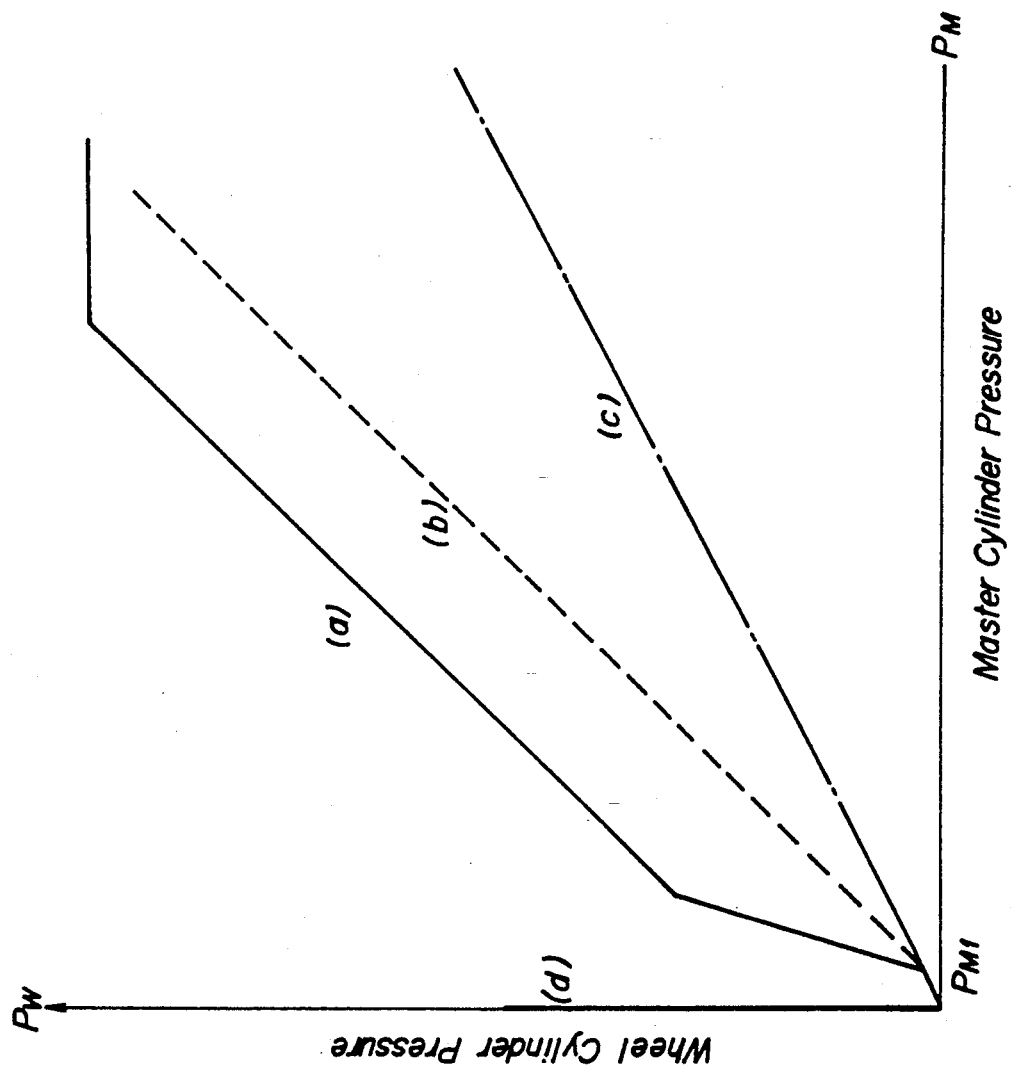

BRAKE CONTROL SYSTEM FOR AUTOMOTIVE VEHICLE

BACKGROUND OF THE INVENTION

1. Field of the Invention

This invention relates to a brake control system which is capable of adjusting a braking force to be applied to automotive vehicle wheels irrespective of manual braking operation.

2. Description of the Related Art

One typical brake control system is disclosed in Japanese Patent Application Laid-open Publication No. 62-149,543, which includes a variable pressure regulator and a pressure modulator disposed between a master cylinder and a wheel cylinder. The pressure regulator receives a working fluid pressure built-up in the master cylinder and also an external fluid pressure for boosting the master cylinder pressure at a desired boosting rate. The pressure modulator receives the boosted fluid pressure to generate a modulated braking pressure to be supplied to the wheel cylinder as the sum of the boosted fluid pressure and the master cylinder pressure. An external pressure source serves to apply the external fluid pressure as a braking force while brake is not manually operated, for performing traction control operation wherein slippage of driving wheels is detected and suppressed or adjusted at an optimum level. On the other hand, the fluid pressure in the wheel cylinder cannot be lowered below the master cylinder pressure, so that it is not readily possible, during swift braking or braking on a slippery road, to perform anti-locking or anti-skid brake control operation for adjusting the braking pressure at the wheel cylinder so as to maintain the wheel slippage at an optimum level.

Another brake control system is disclosed in SAE Technical Paper No. 84 0468, page 3, FIG. 3, which includes a ball valve and pressure reducing unit both which are disposed between the master cylinder and the wheel cylinder and operated synchronously with each other, as well as an external fluid pressure source for controlling the pressure reducing unit by supplying thereto a constant level of control pressure via a three position solenoid valve. When the control pressure is applied to the pressure reducing unit, the ball valve is placed into a closed position such that the wheel cylinder is hydraulically disconnected from the master cylinder and the pressure reducing unit performs pressure control operation for increasing and decreasing the braking pressure in the wheel cylinder. It becomes thus possible to apply the braking force to the wheel cylinder even when the brake is not manually operated, for the purpose of performing a traction control operation. In addition, by disconnecting the wheel cylinder from the master cylinder by means of the ball valve, an anti-skid brake control becomes possible by the action of the pressure reducing unit. On the other hand, however, the anti-skid brake control is performed only in the closed circuit, so that it becomes impossible to achieve the pressure boosting function for boosting the master cylinder pressure.

SUMMARY OF THE INVENTION

In view of the above-mentioned drawbacks in the prior art, it is an object of the present invention to provide a brake control system which achieves traction control and anti-skid brake control functions while maintaining pressure boosting function for a fluid pressure from a master cylinder.

A further object of the invention is to provide a brake control system which exhibits significantly high safety level by enhanced fail-safe function.

To this end, according to one aspect of the invention, a brake control system for an automotive vehicle, includes a master cylinder for producing a master cylinder pressure corresponding to operational magnitude of manually operable means for operating the brake. The system also includes a wheel cylinder provided for each vehicle wheel for applying braking force to the wheel. The cylinder is connected to the master cylinder via a hydraulic circuit control is exercised by an electronically controlled pressure control valve for generating a control pressure. The pressure control valve includes an actuator for reducing pressure level of the control pressure with an increase in the operational magnitude thereof. The pressure control valve is coupled to the master cylinder for introducing the master cylinder into the pressure control valve pressure to increase the control pressure with an increase in the master cylinder pressure. An external fluid pressure source is connected to the pressure control valve through an external pressure supply line, for supplying an external pressure at a predetermined pressure level to the pressure control valve. A composite pressure generator valve is disposed in the hydraulic circuit between the master cylinder and the wheel cylinder for selectively establishing and blocking fluid communication therebetween. The composite pressure generator valve is connected to the pressure control valve to receive the control pressure therefrom The valve is movable between a first valve position which allows fluid communication between the master cylinder and the wheel cylinder for supplying the master cylinder pressure to the wheel cylinder, and a second valve position in which fluid communication between the master cylinder and the wheel cylinder is blocked. Thus a closed circuit is formed across the wheel cylinder and compressing working fluid within the closed circuit. The result is a pressure magnitude corresponding to the magnitude of the control pressure for establishing a boosted pressure to be applied to the wheel cylinder. This boosted pressure is higher than the master cylinder pressure.

According to another aspect of the invention, a brake control system for an automotive vehicle includes a master cylinder for producing a master cylinder pressure corresponding to operational magnitude of manually operable means for operating the brake;

The system also includes a wheel cylinder provided for each vehicle wheel for applying braking force to the wheel. The cylinder is connected to the master cylinder via a hydraulic circuit. Control is exercised by an electronically controlled pressure control valve for generating a control pressure. The pressure control valve includes an actuator for reducing pressure level of the control pressure with an increase in operational magnitude thereof. The pressure control valve is coupled with the master cylinder for introducing the master cylinder pressure into the pressure control valve to increase the control pressure with an increase in the master cylinder pressure. An external fluid pressure is connected to the pressure control valve through an external pressure supply line, for supplying an external pressure at a predetermined pressure level to the pressure control valve. An electromagnetic switching valve interposed in a branch line which is branched from the external pressure supply line for connecting the external pressure source with the pressure control valve, bypassing the external pressure supply line via the switching valve. The switching valve is responsive to excess magnitude of wheel slippage caused during acceleration of the vehicle to establish fluid communication between the external pressure source and the pressure control valve for increasing control pressure. A composite pressure generator valve is disposed in the hydraulic circuit between the master cylinder and said wheel cylinder for selectively establishing and blocking fluid communication therebetween. The composite pressure generator valve is connected to the pressure control valve to receive the control pressure therefrom The valve is movable between a first valve position which allows fluid communication between the master cylinder and the wheel cylinder for supplying the master cylinder pressure to the wheel cylinder, and a second valve position in which fluid communication between the master cylinder and the wheel cylinder is blocked. Thus, a closed circuit is formed across the wheel cylinder and compressing working fluid within the closed circuit. The result is a pressure magnitude corresponding to the magnitude of the control pressure for establishing a boosted pressure to be applied to the wheel cylinder. This boosted pressure is higher than the master cylinder pressure.

According to still another aspect of the invention, a hydraulic circuit system for an automotive brake system includes first pressure source means, including a manually operable component, for generating a first pressure proportional to operational magnitude of the manually operable component. Also included are second pressure source means, independent of the first pressure source means, for generating a second pressure having a predetermined constant pressure level. First hydraulic circuit means connected the first pressure source means to a wheel cylinder to apply thereto a braking force for decelerating rotation of a wheel. Braking force adjusting valve means is disposed in the first hydraulic circuit means for adjusting braking force relative to the first pressure. The braking force adjusting valve means are operable in a first mode for supplying the first pressure to the wheel cylinder while the first pressure is maintained lower than or equal to a predetermined pressure value, and a second mode for blocking the first hydraulic circuit means to interrupt supply of the first pressure to the wheel cylinder and establish a closed hydraulic circuit across the wheel cylinder. Thus compression of working fluid enclosed within the closed circuit is allowed with aid of a third pressure obtained by modulating the second pressure. The braking force adjusting valve means incorporates electromechanical means for generating a mechanical force acting against a hydraulic force generated by the first pressure for adjusting the third pressure.

The present invention will now be described in further detail hereinafter, by referring to certain preferred embodiment shown in the accompanying drawings.

BRIEF DESCRIPTION OF THE DRAWINGS

FIG. 2 is a chart showing the variation of fluid pressure in a wheel cylinder in relation to fluid pressure supplied from a master cylinder, in the preferred embodiment shown in FIG. 1.

DESCRIPTION OF THE PREFERRED EMBODIMENT

Figure 1:
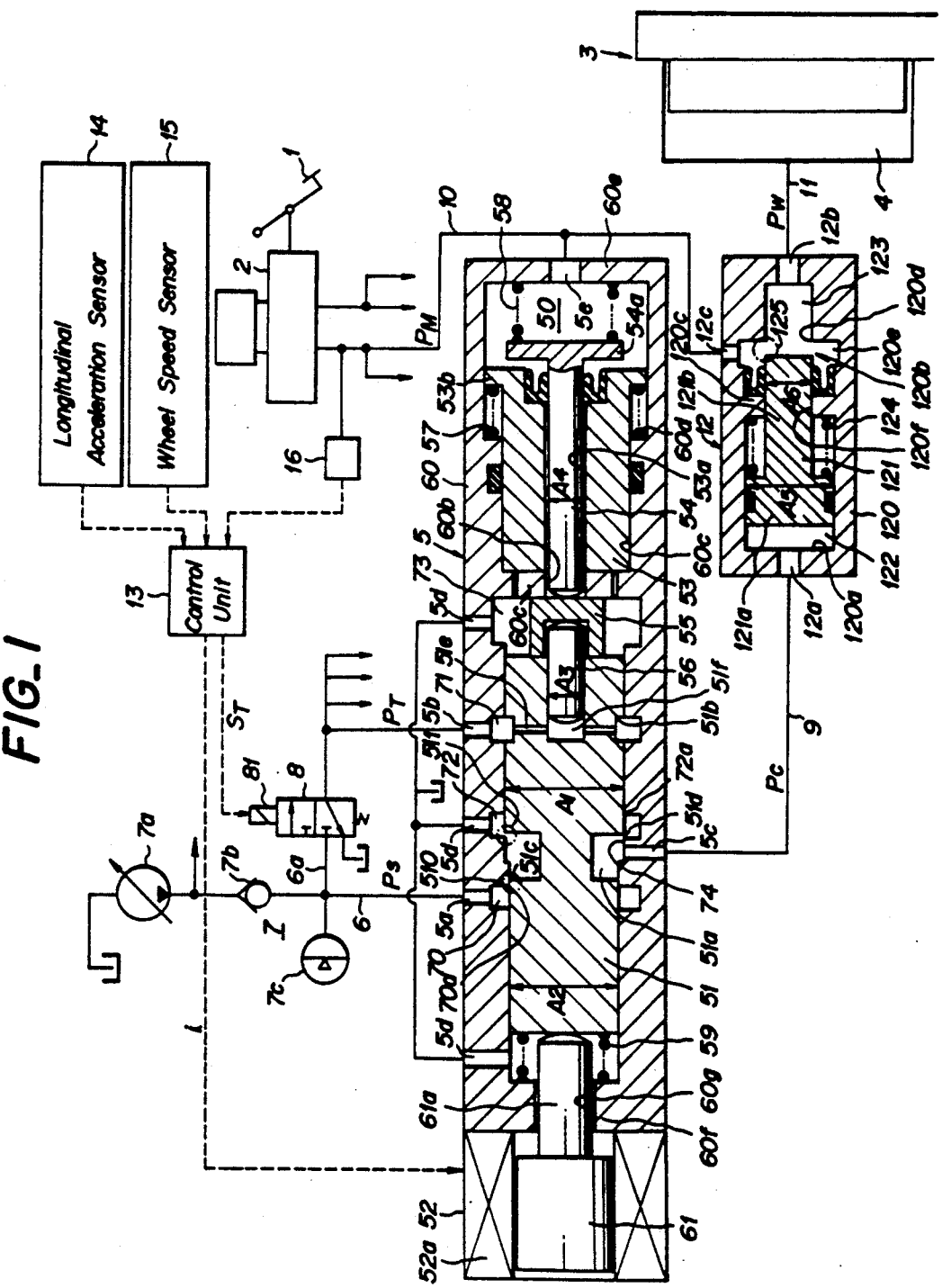
FIG. 1 is a schematic diagram showing a brake control system according to one preferred embodiment of the present invention.

There is shown in FIG. 1 one preferred embodiment of a brake control system according to the present invention, including a master cylinder 2 which serves to build-up a fluid pressure $P_M$ in response to manual braking operation through a brake pedal 1. In this connection, the expression "manual braking operation" as used herein represents a condition in which a driver of an automotive vehicle depresses the brake pedal 1 for actuating the master cylinder 2 to build up the fluid pressure to be delivered to wheel cylinders 4, only one of which is shown in FIG. 1. Also, the expression "master cylinder pressure" as used herein represents the fluid pressure $P_M$ supplied from the master cylinder through hydraulic brake circuits.

As can be seen from FIG. 1, the hydraulic brake circuits connected to the outlet ports of the master cylinder 2 are branched into four circuits for four wheel cylinders of the vehicle, respectively, to facilitate independent control of the fluid pressure to be supplied to the associated wheel cylinder. The branched circuits with associated components form respective channels of hydraulic brake circuits, e.g. front-left, front-right, rear-left and rear-right channels of hydraulic brake circuits. Since all the channels of hydraulic brake circuit are of essentially same construction to each other, discussion for detailed construction for only one channel of hydraulic brake circuit will be sufficient for facilitating full understandings of the invention. Thus, illustrated in FIG. 1 is a detailed hydraulic brake circuit construction for one channel only. In addition, it should be noted that while the circuit of FIG. 1 ha four branched circuits for establishing independent four channels of hydraulic brake circuit network to independently supply fluid pressure to respective of four wheel cylinders, it may be possible to use common branch circuit for supplying fluid pressure to more than one wheel cylinders. Typically, the fluid pressure supply through such common branch circuit may be conveniently introduced for controlling braking pressure in the rear wheel cylinders.

As shown in FIG. 1, the master cylinder pressure $P_M$ is supplied to the wheel cylinder 4 via a composite braking pressure generator valve 12, and also supplied to an electronically controlled pressure control valve 5 through a master cylinder pressure port 5e formed in a valve casing 60. An oil pump 7a is provided as an external fluid pressure source for generating a fluid pressure, and is connected to an inlet port 5a of the pressure control valve 5 formed in the valve casing 60, via a one-way check valve 7b and an external pressure supply line 6. A pressure accumulator 7c is connected to the external pressure supply line 6 for accumulating excess pressure in the external pressure supply line 6, thereby compensating for pulsation in the fluid pressure supplied from the oil pump 7a and regulating the fluid pressure supplied to the inlet port 5a. The fluid pressure supplied to the inlet port 5a of the pressure control valve 5 from the oil pump 7a will be referred to as "external fluid pressure $P_S$".

As can be seen from FIG. 1, the oil pump 7a serves as a common external pressure source for all the channels of the hydraulic brake circuits to commonly supply the discharge pressure thereof. It is of course possible to provide separate oil pumps for respective channels of the brake circuits and thereby permit a smaller displacement volume of the respective pumps, though such separate arrangement of the oil pumps may not always be advantageous particularly from the viewpoint of cost and weight of the entire system.

A branch circuit 6a is branched from the external pressure supply line 6, and connected to a traction control port 5b formed in the valve casing 60 of the pressure control valve 5 via electromagnetically operable switching valve 8 which functions as a traction control valve as will be more fully described hereinafter. As can be seen from FIG. 1, the traction control valve 8 serves as a common component for all the channels of the brake circuits, and is provided with a drain port connected to a fluid reservoir for draining working fluid thereto.

Similarly, the pressure control valve 5 has a plurality of drain ports 5d formed in the valve casing 60, and connected to the fluid reservoir via drain lines. The pressure control valve 5 further includes an outlet port 5c connected to an inlet port 12a of the composite pressure generator valve 12, through a control pressure line 9.

In general, the pressure control valve 5 serves to generate a control pressure $P_C$ with aid of a electromagnetic actuator 52 which comprises a proportioning solenoid in the preferred embodiment. The control pressure $P_C$ generated in the pressure control valve 5 is supplied to the composite pressure generator valve 12 via the control pressure line 9 and the inlet port 12a. The composite pressure generator valve 12 is responsive to the control pressure $P_C$ for selectively establishing and blocking fluid communication between the master cylinder 2 and the wheel cylinder 4 in order to selectively perform pressure boosting operation, traction control operation and anti-skid brake control operation in combination with the pressure control valve 5 as well as the traction control valve 8.

More specifically, the pressure control valve 5 has a valve bore in the valve casing 60, in which a valve spool 51 is disposed for thrusting motion along its longitudinal axis. The inner periphery of the valve bore is formed with a plurality of annular grooves 70, 71, 72 and 73 which are communicated with the inlet port 5a, the traction control port 5b and the drain ports 5d, respectively. An annular groove 74 of a relatively small depth is formed adjacent to the groove 72, and is in communication with the outlet port 5c. On the other hand, annular grooves 51a and 51b are formed on the outer periphery of the valve spool 51. A shoulder 51c extends along one axial end of the groove 51a of the valve spool 51, and cooperates with a shoulder 70a which extends along one axial end of the groove 70 to form a variable orifice 510 for selectively establishing and blocking fluid communication between the inlet port 5a and the outlet port 5c. Another shoulder 51d extends along the other axial end of the groove 51a and has a slightly greater outer diameter than that of the shoulder 51a. This shoulder 51d cooperates with a shoulder 72a to form a variable orifice 511 for selectively establishing and blocking fluid communication between the drain port 5d and the outlet port 5c.

As can be seen from FIG. 1, the grooves 71 and 51b overlap with each other by an amount which is greater than the possible stroke of the valve spool 51 for selectively establishing fluid communication through the variable orifices 510 and 511. Therefore, the grooves 71 and 51b are constantly maintained in communication with each other. To the groove 51b, the outer ends of the radially extending paths 51e open. The inner ends of the path 51e open to an axial bore 51f. A plunger 56 conforming with the bore 51f is disposed within the bore in such a manner as to permit a relative thrusting motion between the plunger and the valve spool 51.

The axial end of the plunger 56 extends from the axial bore 51f and is seated on a plunger seat 55 which is fitted on a radial partitioning wall 60a of the valve casing 60. The partitioning wall 60a defines a center opening 60b. A plunger chamber 60c is defined in the valve casing 60 at the side of the partitioning wall 60a opposite to the valve bore. First and second plungers 53 and 54 are disposed in the plunger chamber 60c in a coaxial fashion. The first plunger 53 has an outer diameter which is substantially equal to or slightly smaller than the inner diameter of the plunger chamber 60c for axial movement relative thereto. The second plunger 54 extends through a center opening 53a formed through the first plunger 53. The second plunger 54 also extends through the center opening 60b of the partitioning wall 60a to abut onto the plunger seat 55 at its one axial end. The first plunger 53 is formed with a radially extending flange 53b having an outer diameter which is substantially equal to the inner diameter of the master cylinder chamber 50 defined in the valve casing in communication with the plunger chamber 60c. The flange 53b has a radial surface facing with the master cylinder pressure chamber 50. A set spring 57 in the form of a compression coil spring is disposed between the flange 53b and a stepped shoulder 60d on the inner periphery of the valve casing 60, for normally biasing the first valve spool 53 toward the master cylinder pressure chamber 50. Similarly, the second plunger 54 has a radially extending flange 54a at the axial end remote from the partitioning wall 60a. A set spring 58 in the form of a compression coil spring is disposed between the end wall 60e of the valve casing 60 and the flange 54a, for normally biasing the second plunger in a direction away from the master cylinder pressure chamber 50. In the illustrated embodiment, the set spring 57 is provided greater spring force than that of the set spring 58.

The electromagnetic actuator 52 is provided at the axial end of the valve casing 60 opposite to the plunger chamber 60c. The electromagnetic actuator 52 includes a solenoid plunger 61 which cooperates with a solenoid coil 52a. The plunger 61 has a stem 61a extending through a center opening 60g formed through the end wall 60f, such that the axial end of the stem 61a abuts against the axial end of the valve spool 51.

The traction control valve 8 is composed of an electromagnetic valve which includes an electromagnetic actuator 81. The actuator 81 controls valve position between a traction control mode position to establish fluid communication between the external pressure line 6 with the traction control port 5b via the branch line 6a, and a normal mode position for blocking fluid communication therebetween.

The composite pressure generator valve 12 has a valve casing 120 through which the inlet port 12a, the outlet port 12b and the master cylinder pressure port 12c are formed. The valve casing 120 defines therein axial bores 120a and 120b which are separated from each other by a radially extending partitioning wall 120c. A spool 121 is generally disposed within the bore 120a, and has a larger diameter section 121a and a smaller diameter section 121b. The larger diameter section 121a has an outer diameter which is substantially equal to the inner diameter of the bore 120a, for defining a control pressure chamber 122 which is in communication with the inlet port 12a. On the other hand, the smaller diameter section 121b of the spool 121 extends through a center opening 120f defined through the partitioning wall 120c to extend into the bore 120b. The outer diameter of the smaller diameter section 121b substantially conforms with the inner diameter of the bore 120b so that the mating shoulders 121c and 120d form the variable orifice 125 for selectively establishing and blocking fluid communication between the master cylinder pressure port 12c and the outlet port 12b. An annular groove 120e is defined for fluid communication between the master cylinder pressure port 12c and the bore 120b. A wheel cylinder chamber 123 is defined in the bore 120b, and is in fluid communication with the wheel cylinder 4 through the outlet port 12b and a wheel cylinder pressure line 11 for supplying a braking pressure $P_W$. A return spring 124 is disposed between the mating radial surfaces of the larger diameter section 121a and the partitioning wall 120c, for normally biasing the plunger toward the control pressure chamber 122.

The electromagnetic actuator 52 of the pressure control valve 5 and the electromagnetic actuator 81 of the traction control valve 8 are connected to a control unit 13 which monitors the vehicle driving condition to produce control signals for controlling operations of these actuators 52, 81. In the illustrated embodiment, for monitoring the vehicle driving condition, the control unit 13 is connected to a longitudinal acceleration sensor 14, a wheel speed sensor 15 and a master cylinder pressure sensor 16. While the illustrated embodiment employs a single wheel speed sensor for monitoring the wheel speed, it should be readily appreciated that by providing more than on wheel speed sensors, preferably for respective four wheels, even more precise traction control and/or anti-skid brake control may be carried out in a facilitated manner. Besides, another parameter or parameters representing the driving behavior of the vehicle may also be employed for performing a brake control which is further precisely adapted to the vehicle driving condition.

The operation of the above-mentioned preferred embodiment of the brake control system according to the present invention will now explained hereinafter in terms of various operational modes of the vehicle individually, so as to facilitate better understandings of the invention.

NORMAL DRIVING STATE

In a normal vehicle driving state without manually operating the brake and without initiating operation of traction control, the fluid pressure level in the master cylinder 2 is substantially zero. That is, the master cylinder pressure $P_M$ at the master cylinder pressure port 5e of the pressure control valve 5 and the master cylinder pressure port 12c of the composite pressure generator valve 12 is maintained substantially zero to maintain the wheel cylinder 4 in inoperative state.

On this occasion, as mentioned hereinbefore, the set spring 57 provides a greater spring force than that of the set spring 58, so that the flange 53b of the first plunger 53 abutting against the flange 54a of the second plunger 54 pushes the second plunger toward the master cylinder pressure chamber 50 by the set spring 57 overcoming the spring force of the set spring 58. At the same time, since wheel slippage is maintained within acceptable level, the traction control valve 8 is also maintained at inoperative position to disconnect the traction control port 51b from the external pressure line 6. Also, at this position, the control signal from the control unit 13 maintains the electromagnetic actuator 52 of the pressure control valve 5 at inoperative position, so that the valve spool 51 is maintained at the position substantially as illustrated to establish communication between the outlet port 5c and the drain port 5d and block fluid communication between the inlet port 5a and the outlet port 5c. Thus, the fluid pressure level in the control chamber 122 of the composite pressure generator valve 12 is maintained at substantially zero or at the atmospheric pressure level, so that the spool 121 stays at an initial position under the spring force of the return spring 124.

In this instance, the master cylinder 2 is directly connected to the wheel cylinder 4 via the master cylinder pressure line 10, the wheel cylinder pressure chamber 123 of the composite pressure generator valve 12 and the wheel cylinder pressure line 11.

NORMAL BRAKING MODE

When brake is manually operated by driver's depression of the brake pedal 1, the master cylinder pressure $P_M$ is built-up with a pressure level corresponding to the magnitude of depression of the brake pedal 1. Along with the build-up of the master cylinder pressure $P_M$, the pressure level in the master cylinder pressure line 10 rises accordingly to supply an increased pressure to the master cylinder pressure port 5e of the pressure control valve 5 and the master cylinder pressure port 12c of the composite pressure generator valve 12. As mentioned above, in this instance, the direct communication between the master cylinder 2 and the wheel cylinder 4 is maintained so that the master cylinder pressure $P_M$ is directly supplied to the wheel cylinder 4 as the wheel cylinder pressure $P_W$ from the composite pressure generator valve 12.

On the other hand, as the master cylinder pressure $P_M$ increases beyond a predetermined value $p_{M1}$ by manual braking operation, the increased master cylinder pressure $P_M$ introduced into the master cylinder pressure chamber 50 of the pressure control valve 5 overcomes the spring force of the set spring 57 to shift the plunger 54 in a direction away from the master cylinder pressure chamber 50. At the same time, the increased master cylinder pressure $P_M$ cooperates with the spring force of the set spring 58 to overcome the spring force of the set spring 57 and to cause shifting of the second plunger 54 toward the valve spool. The second plunger 54 is exerted by a force $F_{54}$ which may be expressed as:

$$F_{54} = F_2 + A_4 \cdot P_M \quad (1)$$

wherein, $F_2$ is the spring force of the set spring 58; and $A_4$ is the pressure-receiving area of the second plunger 54.

Thus, the force $F_{54}$ exerted on the second plunger 54 increases with increase in the master cylinder pressure $P_M$. When the force $F_{54}$ becomes greater than the spring force exerted on the valve spool 51 by the spring 59, the plunger 54 causes shifting of the valve spool 51 via the plunger seat 55 toward the electromagnetic actuator 52, i.e. toward left in FIG. 1. Then, the shoulder 51c of the valve spool 51 moves across the associated shoulder 70a to open the variable orifice 510 to establish fluid communication between the inlet port 5a and the outlet port 5c. The external fluid pressure $P_S$ at a constant pressure level as regulated by the pressure accumulator 7c is now supplied to the inlet port 12a of the composite pressure generator valve 12 via the outlet port 5c and the control pressure line 9, as the control pressure $P_C$. The shifting amount of the valve spool 51 is determined according to the magnitude of the force applied to the second plunger 54. Here, the equibrium of forces exerted on the second plunger 54 and the valve spool 51 can be expressed as:

$$(A_1 - A_2) \cdot P_C = A_4 \cdot P_M + F_2 - F_1 \quad (2)$$

wherein, $A_1$ and $A_2$ are the pressure-receiving areas of the larger and smaller diameter sections of the valve spool 51 respectively; and $F_1$ is the spring force of the spring 59.

As can be appreciated from the equation (2) above, the control pressure $P_C$ is proportional to the master cylinder pressure $P_M$ but greater than the master cylinder pressure by an amount corresponding to $(F_2 - F_1)$. The control pressure $P_C$ supplied to the control chamber 122 of the composite pressure generator valve 12 becomes higher than that of the master cylinder pressure $P_M$ supplied to the master cylinder pressure port 12c. The pressure level at the control chamber 122 increases to bias the spool 121 toward the wheel cylinder pressure chamber 123. In response to increase in the control pressure $P_C$ at the control chamber 122, the shoulder 121c of the spool 121 moves across the associated shoulder 120d of the internal periphery of the valve casing 120 to block the master cylinder pressure port 12c and establish a closed hydraulic circuit which is composed of the wheel cylinder pressure chamber 123 of the composite pressure generator valve 12, the wheel cylinder pressure line 11 and the wheel cylinder 4. Upon blocking of the communication between the master cylinder pressure port 12c and the outlet port 12b, the wheel cylinder pressure $P_W$ at the wheel cylinder pressure chamber 123, which is supplied to the wheel cylinder 4 via the wheel cylinder pressure line 11, is at a level equal to that of the master cylinder pressure $P_M$. By continued travel of the spool 121 upon further increase in the control pressure $P_C$ within the control pressure chamber 122, the volume of the closed circuit is decreased to compress the working fluid enclosed therein and generate a wheel cylinder pressure $P_W$ having a higher pressure level than the master cylinder pressure $P_M$. In this instance, the equibrium of forces exerted on the spool 121 by the master cylinder pressure $P_M$, the wheel cylinder pressure $P_W$ and the spring force of the return spring 124 can be expressed as:

$$P_W = \frac{A_5}{A_6 \cdot (A_1 - A_2)} \cdot (A_4 \cdot P_M + F_2 - F_1) \quad (3)$$

wherein, $A_5$ and $A_6$ are the pressure-receiving areas of the larger diameter section 121a and the smaller diameter section 121b of the spool 121, respectively.

As can be appreciated from the foregoing discussion, the illustrated embodiment of the invention makes it possible to achieve a pressure boosting function for the wheel cylinder pressure $P_W$ in accordance with the characteristic as shown by line (a) in FIG. 2.

Here, when the control current i is applied to the solenoid coil 52a from the control unit 13, the electromagnetic actuator 52 is activated to push the valve spool 51 toward the master cylinder pressure chamber 50 against the biasing force exerted through the second plunger 54. The force $F_S$ exerted by the electromagnetic actuator 52 thus serves to reduce the control pressure $P_C$ to be applied to the control pressure chamber 122. In such case, equibrium of forces exerted to the spool 51 can be expressed as:

$$(A_1 - A_2) \cdot P_C = A_4 \cdot P_M + F_2 - F_1 - F_S \quad (4)$$

The wheel cylinder pressure $P_W$ reduced by an amount corresponding to the force $F_S$ exerted by the electromagnetic actuator 52 can be expressed as:

$$P_W = \frac{A_5}{A_6 \cdot (A_1 - A_2)} \cdot (A_4 \cdot P_M + F_2 - F_1 - F_S) \quad (5)$$

Thus, the wheel cylinder pressure $P_W$ is reduced with increase in the control current i supplied to the solenoid coil 52a. In such case, the variation characteristic of the wheel cylinder pressure $P_W$ in terms of the master cylinder pressure $P_M$ becomes as shown by line (b) in FIG. 2.

When the control current i is maintained at the maximum value, equibrium is established at the position of the valve spool 51 as shown in FIG. 1 for blocking fluid communication between the inlet port 5a and the outlet port 5c, and simultaneously establishing fluid communication between the outlet port 5c and the drain port 5d. The control pressure $P_C$ in the control pressure chamber 122 of the composite pressure generator valve 12 is drained and thus reduced to the atmospheric pressure. By this, the spool 121 is returned to the initial position to establish fluid communication between the master cylinder pressure port 12c and the outlet port 12b, so that the master cylinder pressure $P_M$ is directly admitted to the wheel cylinder 4 as the wheel cylinder pressure $P_W$. In this case, the variation characteristic of the wheel cylinder pressure $P_W$ becomes as shown by line (c) in FIG. 2.

In order to achieve an optimum control of the variation characteristics of the wheel cylinder pressure $P_W$ at the wheel cylinder 4, the control unit 13 is set to have various patterns of variation characteristics of the wheel cylinder pressure $P_W$ in terms of the master cylinder pressure $P_M$. Such characteristics may be preset in the control unit 13 in the form of stored map or table to be looked up in terms of given control parameter or parameters which are representative of the vehicle driving condition, e.g., the longitudinal acceleration and the wheel speed as in the illustrated embodiment. The control unit 13 then selects one of the preset patterns of variation characteristics of the wheel cylinder pressure $P_W$ to achieve an optimum pressure-boosting characteristic.

ANTI-SKID CONTROL MODE

Upon swift deceleration and braking operation on low friction ($\mu$) road which tends to bring the wheel or wheels into a locked state, the control unit 13 initiates the anti-skid or anti-locking brake control operation. Detection of actual skidding or locked state of the wheels or prediction of such state is known, per se, and the present invention can be practically implementated by employing any known technology to detect or predict the wheel condition causing or potentially causing the skidding, in a facilitated manner and with a desired accuracy.

In the illustrated embodiment, anti-skid control is performed by switching the variation characteristics of the wheel cylinder pressure $P_W$ between the characteristics (a), (b) and (c) of FIG. 2. Namely, the wheel cylinder pressure $P_W$ can be increased up to the characteristic of (a) and decreased down to the characteristic of (c). Switching of the variation characteristics of the wheel cylinder pressure $P_W$ can be achieved by adjusting the magnitude of the control current i to be applied to the solenoid coil 52a of the electromagnetic actuator 52.

In the illustrated embodiment, the longitudinal acceleration as detected by the longitudinal acceleration sensor 14 is employed as a data representative of the vehicle speed or vehicle body speed. It is of course that the vehicle speed can be obtained by integrating the longitudinal acceleration. Furthermore, based on the vehicle speed and the wheel speed detected by the wheel speed sensor 15, it is possible to ascertain wheel slippage. The control unit 13 determines the magnitude of the control current i to be supplied to the solenoid coil 52a so as to maintain the wheel slippage within an optimum range, i.e. 10% to 20% of the vehicle speed. Therefore, by controlling the pressure control valve 5 with the control current i, the desired anti-skid brake control can be performed for providing an optimum braking performance.

TRACTION CONTROL MODE

Upon standstill start up or swift acceleration of the vehicle, the driving wheels are applied with an excessive torque and tend to be brought into spinning state. Vehicle driving state possibly causing wheel spinning can be detected or predicted in a manner known, per se. Thus, when the vehicle driving condition causing or potentially causing wheel spinning is detected or predicted, the control unit 13 enters into the traction control mode operation. On this occasion, the control unit 13 generates a traction control signal $S_T$ and sends the same to the solenoid 81 of the traction control valve 8. In practice, the traction control signal $S_T$ is an ON/OFF signal which is maintained OFF in the absence of traction control operation command. In response to the traction control signal $S_T$, the traction control valve 8 switches the valve position so as to establish fluid communication between the branch circuit 6a and the traction control port 5b of the pressure control valve 5. By this, the external fluid pressure $P_S$ is introduced into the traction control port 5b as a traction control pressure $P_T$ which is exerted on the plunger 56 via the radially extending paths 51e and the axial bore 51f therebetween. Since the plunger 56 is in abutment with the plunger seat 55, the valve spool 51 is applied with a reaction force of a magnitude which is equal to that exerted on the plunger 56, so that the valve spool 51 is shifted toward the electromagnetic actuator 52 for opening the variable orifice 510. In this instance, the equbrium of forces exerted to the valve spool 51 can be expressed by:

$$(A_1-A_2)\cdot P_C = A_3\cdot P_T + F_1 - F_S \qquad (6)$$

wherein, $A_3$ is the pressure-receiving area of the plunger 56.

As can be appreciated from the equation (6) above, the control pressure $P_C$ is variable from a maximum force determined by the traction control pressure $P_T$ and a minimum force which has been minimized by the force $F_S$ exerted from the electromagnetic actuator 52.

As a result, the external fluid pressure $P_S$ is supplied to the control pressure chamber 122 as the control pressure $P_C$ via the outlet port 5c, the control pressure line 9 and the inlet port 12a. The spool 121 is thus shifted to establish the closed circuit composed of the wheel cylinder pressure chamber 123, the wheel pressure line 11 and the wheel cylinder 4. By further travel of the spool 121 toward the wheel cylinder pressure chamber 123, the working fluid in the closed circuit is compressed to generate braking force at the wheel cylinder. In this instance, the wheel cylinder pressure is varied according to the characteristic as shown by line (d) in FIG. 2. By applying an adequate braking force, the wheel speed is reduced to successfully suppress the wheel spinning and resume the traction.

FAIL-SAFE MODE

Upon failure of the electronic control system, the control current i for the electromagnetic actuator 52 is set zero to deenergize the solenoid coil 52a and set the traction control signal $S_T$ to OFF state to place the traction control valve 8 at the closed position. Therefore, the force equibrium at the spool 51 of the pressure control valve 5 is established according to the above-mentioned equation (2). The electromagnetic actuator 52 and the traction control valve 8 are maintained inoperative to disable the anti-skid control mode and the traction control mode operations, though it is possible to preserve a satisfactory pressure boosting function according to the characteristic as shown by line (a) in FIG. 2.

On the other hand, when failure is caused on the part of the oil pump 7a or associated component, it may be difficult or impossible to supply the external fluid pressure $P_S$ to be introduced through the inlet port 5a, and the external fluid pressure may become zero. On such occasion, the spool 121 is placed to the initial position as illustrated in FIG. 1 to maintain fluid communication between the master cylinder pressure port 12c and the outlet port 12b. Therefore, even though the pressure boosting function cannot be achieved, operation of the brake is still possible with the fluid pressure supplied from the master cylinder 2. In this instance, the variation characteristic of the wheel cylinder pressure $P_W$ becomes as shown by line (c) in FIG. 2.

It will be readily appreciated from the foregoing detailed description that the present invention provides an improved brake control system which achieves traction control and anti-skid brake control functions while maintaining the desired pressure boosting function for a fluid pressure from a master cylinder, and which exhibits significantly high safety level by an enhanced fail-safe function.

While the present invention has been explained with reference to certain specific embodiment presented by way of example only, it is of course that various modifications and/or alterations may be made without departing from the scope of the invention as defined in the appended claims.

What is claimed is:

1. A brake control system for an automotive vehicle, comprising:
   a master cylinder for producing a master cylinder pressure corresponding to operational magnitude of manually operable means for operating brake;
   a wheel cylinder provided for each vehicle wheel for applying braking force to said wheel, said wheel cylinder being connected to said master cylinder via a hydraulic circuit;

an electronically controlled pressure control valve for generating a control pressure, said pressure control valve including an actuator for reducing pressure level of said control pressure with an increase in operational magnitude thereof, said pressure control valve being coupled with said master cylinder for introducing said master cylinder pressure into said pressure control valve pressure to increase said control pressure with an increase in said master cylinder pressure;

an external fluid pressure source connected to said pressure control valve through an external pressure supply line, for supplying an external pressure at a predetermined pressure level to said pressure control valve; and a composite pressure generator valve disposed in said hydraulic circuit between said master cylinder and said wheel cylinder for selectively establishing and blocking fluid communication therebetween, said composite pressure generator valve being connected to said pressure control valve to receive said control pressure therefrom and being movable between a first valve position which allows fluid communication between said master cylinder and said wheel cylinder for supplying said master cylinder pressure to said wheel cylinder, and a second valve position in which fluid communication between said master cylinder and said wheel cylinder is blocked for forming a closed circuit across said wheel cylinder and compressing working fluid within said closed circuit to have a magnitude corresponding to the magnitude of said control pressure for establishing a boosted pressure to be applied to said wheel cylinder, which is higher than said master cylinder pressure, wherein the magnitude of said control pressure is determined by a balance of a force derived from said master cylinder pressure and a force derived from said actuator, and wherein said actuator provides a maximum force which cancels said force derived from said master cylinder pressure to maintain said control pressure at a value of zero thus, supplying pressure directly from said master cylinder to said wheel cylinder.

2. The brake control system as set forth in claim 1, further comprising an electromagnetic switching valve interposed in a branch line which is branched from said external pressure supply line for connecting said external pressure source with said pressure control valve by-passing said external pressure supply line via said switching valve, said switching valve being responsive to excessive magnitude of wheel slippage caused during acceleration of the vehicle to establish fluid communication between said external pressure source and said pressure control valve for increasing control pressure to place said composite pressure generator valve at said second valve position.

3. The brake control system as set forth in claim 2, wherein the magnitude of said control pressure generated in active state of said switching valve is maximum when said actuator is maintained inoperative, and is decreased with increase in force applied by said actuator.

4. The brake control system as set forth in claim 2, further comprising an electronic control means which detect a vehicle driving condition satisfying a predetermined criterion for producing a control signal to control magnitude of force applied by said actuator to thereby adjust magnitude of said control pressure to be applied to said composite pressure generator valve.

5. The brake control system as set forth in claim 4, wherein said control means detect or predict wheel slippage which is greater than a predetermined value in an active state of said master cylinder to generate said master cylinder pressure by manual operation of said manually operable means, for adjusting said force applied by said actuator to adjust the pressure applied to said wheel cylinder for maintaining wheel slippage within a predetermined range.

6. The brake control system as set forth in claim 5, wherein said control means is adapted to periodically determine said control signal enabling s id maximum force to be applied by said actuator for placing said composite pressure generator valve at said first valve position to reduce the pressure in said wheel cylinder while the wheel slippage is greater than said predetermined value, said control signal disabling said actuator for placing said composite pressure generator valve at said second valve position to apply increased pressure to said wheel cylinder while said wheel slippage is maintained smaller than said predetermined value.

7. The brake control system as set forth in claim 1, further comprising an electronic control means which detect a vehicle driving condition satisfying a predetermined criterion for producing a control signal to control magnitude of force applied by said actuator to thereby adjust magnitude of said control pressure to be applied to said composite pressure generator valve.

8. The brake control system as set forth in claim 7, wherein said control means detect or predict wheel slippage which is greater than a predetermined value in an active state of said master cylinder to generate said master cylinder pressure by manual operation of said manually operable means, for adjusting said force applied by said actuator to adjust the pressure applied to said wheel cylinder for maintaining wheel slippage within a predetermined range.

9. The brake control system as set forth in claim 8, wherein said control means periodically determine said control signal enabling said maximum force to be applied by said actuator for placing said composite pressure generator valve at said first valve position to reduce the pressure in said wheel cylinder while the wheel slippage is greater than said predetermined value, said control signal disabling said actuator for placing said composite pressure generator valve at said second valve position to apply increased pressure to said wheel cylinder while said wheel slippage is maintained smaller than said predetermined value.

10. A brake control system for an automotive vehicle, comprising:

a master cylinder for producing a master cylinder pressure corresponding to operational magnitude of manually operable means for operating brake;

a wheel cylinder provided for each vehicle wheel for applying braking force to said wheel, said wheel cylinder being connected to said master cylinder via a hydraulic circuit;

an electronically controlled pressure control valve for generating a control pressure, said pressure control valve including an actuator for reducing pressure level of said control pressure with an increase in operational magnitude thereof, said pressure control valve being coupled with said master cylinder for introducing said master cylinder pressure into said pressure control valve to increase said control pressure with an increase in said master cylinder pressure;

an external fluid pressure source connected to said pressure control valve through an external pressure supply line, for supplying an external pressure at a predetermined pressure level to said pressure control vale;

an electromagnetic switching valve interposed in a branch line which is branched from said external pressure supply line for connecting said external pressure source with said pressure control valve bypassing said external pressure supply line via said switching valve, said switching valve being responsive to excess magnitude of wheel slippage caused during acceleration of the vehicle to establish fluid communication between said external pressure source and said pressure control valve for increasing control pressure; and a composite pressure generator valve disposed in said hydraulic circuit between said master cylinder and said wheel cylinder for selectively establishing and blocking fluid communication therebetween, said composite pressure generator valve being connected to said pressure control valve to receive said control pressure therefrom and being movable between a first valve position which allows fluid communication between said master cylinder and said wheel cylinder for supplying said master cylinder pressure to said wheel cylinder, and a second valve position in which fluid communication between said master cylinder and said wheel cylinder is blocked for forming a closed circuit across said wheel cylinder and compressing working fluid within said closed circuit to have a magnitude corresponding to the magnitude of said control pressure for establishing a boosted pressure to be applied to said wheel cylinder, which is higher than said master cylinder pressure, wherein the magnitude of said control pressure is determined by a balance of a force derived from said master cylinder pressure and a force derived from said actuator, and wherein said actuator provides a maximum force which cancels said force derived from said master cylinder pressure to maintain said control pressure at a value of zero thus, supplying pressure directly from said master cylinder to said wheel cylinder.

11. The brake control system as set forth in claim 10, wherein the magnitude of said control pressure generated in active state of said switching valve is maximum when said actuator is maintained inoperative, and is decreased with increase in force applied by said actuator.

12. The brake control system as set forth in claim 11, further comprising an electronic control means which is adapted to detect vehicle driving condition satisfying a predetermined criterion for producing a control signal to control magnitude of force applied by said actuator thereby to adjust magnitude of said control pressure to be applied to said composite pressure generator valve.

13. The brake control system as set forth in claim 12, wherein said control means is adapted to detect or predict wheel slippage which is greater than a predetermined value in active state of said master cylinder to generate said master cylinder pressure by manual operation of said manually operable means, for adjusting said force applied by said actuator to adjust the pressure applied to said wheel cylinder for maintaining wheel slippage within a predetermined range.

14. The brake control system as set forth in claim 13, wherein said control means is adapted to periodically determine said control signal enabling said maximum force to be applied by said actuator for placing said composite pressure generator valve at said first valve position to reduce the pressure in said wheel cylinder while the wheel slippage is greater than said predetermined value, said control signal disabling said actuator for placing said composite pressure generator valve at said second valve position to apply increased pressure to said wheel cylinder when said wheel slippage is maintained smaller than said predetermined value.

15. The brake control system as set forth in claim 12, wherein said control means is adapted to further detect wheel slippage in excess of a predetermined magnitude during acceleration of the vehicle, to produce a traction control signal for controlling operation of said switching valve.

* * * * *